US012602567B2

(12) United States Patent
Bhanushali et al.

(10) Patent No.: US 12,602,567 B2
(45) Date of Patent: Apr. 14, 2026

(54) SYSTEM AND METHOD FOR RENDERING A VIRTUAL MODEL-BASED INTERACTION

(71) Applicant: Dineshkumar Premjibhai Bhanushali, Mehsana (IN)

(72) Inventors: Dineshkumar Premjibhai Bhanushali, Mehsana (IN); Paresh Pravin Nanda, Mumbai (IN)

(73) Assignee: Dineshkumar Bhanushali (IN)

( * ) Notice: Subject to any disclaimer, the term of this patent is extended or adjusted under 35 U.S.C. 154(b) by 209 days.

(21) Appl. No.: 18/555,546

(22) PCT Filed: Jun. 8, 2021

(86) PCT No.: PCT/IB2021/055009
§ 371 (c)(1),
(2) Date: Oct. 17, 2023

(87) PCT Pub. No.: WO2022/224029
PCT Pub. Date: Oct. 27, 2022

(65) Prior Publication Data
US 2024/0202489 A1      Jun. 20, 2024

(30) Foreign Application Priority Data
Apr. 19, 2021      (IN) .............................. 202121018006

(51) Int. Cl.
| | |
|---|---|
| *G06N 3/006* | (2023.01) |
| *G06Q 10/40* | (2026.01) |
| *G06T 17/00* | (2006.01) |

(52) U.S. Cl.
CPC ............. *G06N 3/006* (2013.01); *G06Q 10/40* (2026.01); *G06T 17/00* (2013.01); *G06T 2200/24* (2013.01)

(58) Field of Classification Search
CPC ........ G06N 3/006; G06N 20/00; G06Q 50/01; G06T 17/00; G06T 2200/24; G06F 3/011
See application file for complete search history.

(56) References Cited

U.S. PATENT DOCUMENTS

| | | | | |
|---|---|---|---|---|
| 8,910,055 B2 * | 12/2014 | Berger | ............... | G06Q 30/0269 |
| | | | | 715/751 |
| 2009/0299932 A1 * | 12/2009 | Hodge | ..................... | G06N 5/02 |
| | | | | 706/45 |

(Continued)

FOREIGN PATENT DOCUMENTS

| | | |
|---|---|---|
| CN | 110456965 A | 11/2019 |
| WO | 2019156332 A1 | 8/2019 |

*Primary Examiner* — King Y Poon
*Assistant Examiner* — Patrick P Galera
(74) *Attorney, Agent, or Firm* — Jason C. Cameron

(57) ABSTRACT

A system for rendering a virtual model-based interaction is provided. The system includes a processing subsystem which includes a virtual model generation module 40 which receives input(s), generates a learning model, and generates a virtual model. The processing subsystem also includes an event creating module 50 which creates an event. The processing subsystem also includes a relationship searching module 60 which receives multiple relationship-based details, and searches an account associated with the second user(s). The processing subsystem also includes a connection management module 70 which generates a connection request, establishes a connection between the first user and the second user(s), and provides multiple second user details to the first user. The processing subsystem also includes an event triggering module 80 which extracts event-related keyword(s) and triggers the event at a predefined schedule obtained based on mapping of the event-related keyword(s) with the second user detail(s), thereby rendering the virtual model-based interaction.

10 Claims, 5 Drawing Sheets

(56) References Cited

U.S. PATENT DOCUMENTS

| 2013/0257876 | A1* | 10/2013 | Davis | G06T 13/40 |
| | | | | 345/473 |
| 2019/0095775 | A1 | 3/2019 | Lembersky et al. | |
| 2019/0188895 | A1* | 6/2019 | Miller, IV | G06F 3/011 |
| 2019/0289367 | A1* | 9/2019 | Siddiq | H04N 21/485 |
| 2019/0392627 | A1 | 12/2019 | Grant | |
| 2020/0114608 | A1* | 4/2020 | Harada | G06N 20/00 |
| 2022/0164818 | A1* | 5/2022 | Sato | G06Q 30/02 |

* cited by examiner

SYSTEM AND METHOD FOR RENDERING A VIRTUAL MODEL-BASED INTERACTION

CROSS-REFERENCE TO RELATED APPLICATION

This application claims priority from a patent application filed in India having Patent Application No. 202121018006, filed on Apr. 19, 2021, and titled "SYSTEM AND METHOD FOR RENDERING A VIRTUAL MODEL-BASED INTERACTION" and a PCT Application No. PCT/IB2021/055009 filed on Jun. 8, 2021, and titled "SYSTEM AND METHOD FOR RENDERING A VIRTUAL MODEL-BASED INTERACTION."

FIELD OF INVENTION

Embodiments of a present disclosure relate to providing an interaction to happen via a virtual model, and more particularly to a system and method for rendering a virtual model-based interaction.

BACKGROUND

Interaction is a kind of action that occurs as two or more objects have an effect upon one another. The idea of a two-way effect is essential in the concept of interaction, as opposed to a one-way causal effect. Social interaction is the interaction between individuals. Such an interaction can happen in person, or via a communication means such as, but not limited to, a phone call, via a video call, via messaging, or the like. However, in the case of using the communication means, the interaction may not provide a realistic experience to the corresponding individuals. With the advancement in technology, a plurality of approaches is proposed in order to provide a more realistic experience for the individuals while interacting or communicating. However, such approaches use methods, implementation of which is very complicated, time-consuming, and requires the storing of huge data.

Hence, there is a need for an improved system and method for rendering a virtual model-based interaction which addresses the aforementioned issues.

BRIEF DESCRIPTION

In accordance with one embodiment of the disclosure, a system for rendering a virtual model-based interaction is provided. The system includes a processing subsystem hosted on a server. The processing subsystem is configured to execute on a network to control bidirectional communications among a plurality of modules. The processing subsystem includes a virtual model generation module. The virtual model generation module is configured to receive one or more inputs corresponding to an entity upon registering a first user on a centralized platform. The virtual model generation module is also configured to generate a learning model based on a pre-stored dataset. The learning model is configured to learn one or more features corresponding to the entity in real-time upon analyzing the one or more inputs using a machine learning technique. Further, the virtual model generation module is also configured to generate a virtual model of the entity based on the learning model using an image analysis-based technique. The processing subsystem also includes an event creating module operatively coupled to the virtual model generation module. The event creating module is configured to create an event by associating the event with the virtual model generated by the virtual model generation module. Further, the processing subsystem also includes a relationship searching module operatively coupled to the event creating module. The relationship searching module is configured to receive a plurality of relationship-based details corresponding to a relationship between the first user and one or more second users, upon creating the event. The relationship searching module is also configured to search an account associated with the one or more second users on the centralized platform upon receiving the corresponding plurality of relationship-based details. Furthermore, the processing subsystem also includes a connection management module operatively coupled to the relationship searching module. The connection management module is configured to generate a connection request upon searching and selecting the account associated with the one or more second users. The connection management module is also configured to establish a connection between the first user and the one or more second users when the corresponding one or more second users accept the connection request. The connection management module is also configured to provide a plurality of second user details corresponding to the one or more second users to the first user on the centralized platform upon establishing the connection. Furthermore, the processing subsystem also includes an event triggering module operatively coupled to the connection management module. The event triggering module is configured to extract one or more event-related keywords from the event created by the event creating module upon obtaining the corresponding plurality of second user details. The event triggering module is also configured to trigger the event in real-time at a predefined schedule obtained based on mapping of the one or more event-related keywords with the plurality of second user details, thereby rendering the virtual model-based interaction.

In accordance with another embodiment, a method for rendering a virtual model-based interaction is provided. The method includes receiving one or more inputs corresponding to an entity upon registering a first user on a centralized platform. The method also includes generating a learning model based on a pre-stored dataset, wherein the learning model is configured to learn one or more features corresponding to the entity in real-time upon analyzing the one or more inputs using a machine learning technique. Further, the method also includes generating a virtual model of the entity based on the learning model using an image analysis-based technique. Furthermore, the method also includes creating an event by associating the event with the virtual model generated by the virtual model generation module. Furthermore, the method also includes receiving a plurality of relationship-based details corresponding to a relationship between the first user and one or more second users upon creating the event. Furthermore, the method also includes searching an account associated with the one or more second users on the centralized platform upon receiving the plurality of relationship-based details. Furthermore, the method also includes generating a connection request upon searching and selecting the account associated with the one or more second users. Furthermore, the method also includes establishing a connection between the first user and the one or more second users when the corresponding one or more second users accept the connection request. Furthermore, the method also includes providing a plurality of second user details corresponding to the one or more second users to the first user on the centralized platform upon establishing the connection. Furthermore, the method also includes extracting one or more event-related keywords from the event created by the event creating module upon obtaining the corresponding plurality of second user details. Furthermore, the method also includes triggering the event in real-time at a predefined schedule obtained based on mapping of the one or more event-related keywords with the plurality of second user details, thereby rendering the virtual model-based interaction.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system for rendering a virtual model-based interaction. As used herein, the term "virtual model-based interaction" is defined as an interaction in which a virtual model is used to interact. The system described hereafter in FIG. 1 is the system for rendering the virtual model-based interaction.

Figure 1:
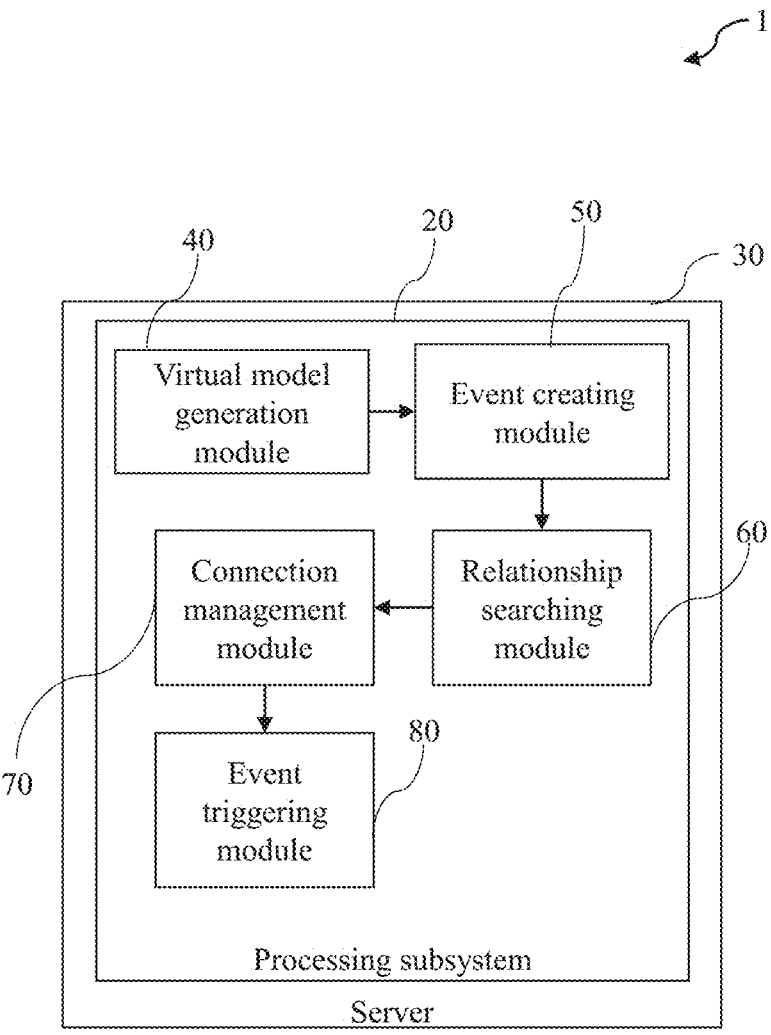
FIG. 1 is a block diagram representation of a system for rendering a virtual model-based interaction in accordance with an embodiment of the present disclosure.
Figure 2:
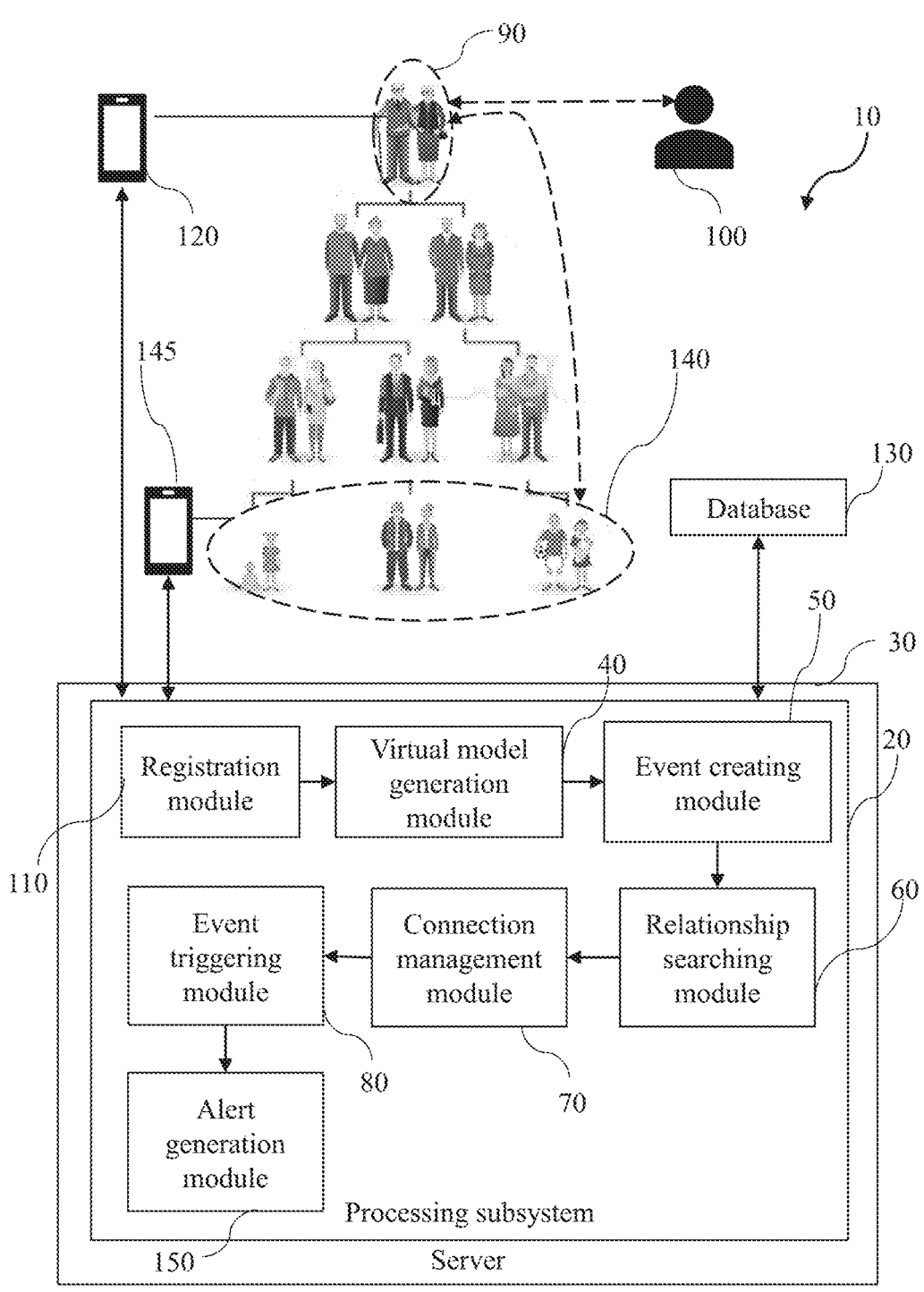
FIG. 2 is a block diagram representation of an exemplary embodiment of the system for rendering the virtual model-based interaction of FIG. 1 in accordance with an embodiment of the present disclosure.

FIG. 1 is a block diagram representation of a system 10 for rendering a virtual model-based interaction in accordance with an embodiment of the present disclosure. As used herein, rendering the virtual model-based interaction may refer to providing a facility to at least two users to interact with each other or with an entity via a virtual model of the entity. In one embodiment, the entity may include a person, an animal, a bird, a reptile, a celebrity, a pet, the at least two users, or the like. In one embodiment, the at least two users may include a first user, a second user, and the like. The system 10 includes a processing subsystem 20 hosted on a server 30. In one embodiment, the server 30 may include a cloud server or a local server. The processing subsystem 20 is configured to execute on a network (not shown in FIG. 1) to control bidirectional communications among a plurality of modules. Basically, in order to render the virtual model-based interaction, initially, the virtual model may have to be generated. Thus, the processing subsystem 20 includes a virtual model generation module 40. The virtual model generation module 40 is configured to receive one or more inputs corresponding to the entity upon registering a first user on a centralized platform. In an embodiment, for the first user to be able to use the system 10, the first user may have to register on the centralized platform. Thus, the processing subsystem 20 may also include a registration module (as shown in FIG. 2) operatively coupled to the virtual model generation module 40.

The registration module may be configured to register the first user on the centralized platform upon receiving a plurality of first user details via a first user interface of a first user device. In one exemplary embodiment, the plurality of first user details may include a name, contact details, birthday details, anniversary details, one or more events-related details, favorites, hobbies, likes and dislikes, relatives' names, friends' names, and the like of the first user. In such embodiment, the one or more events-related details may include details corresponding to one or more events such as, but not limited to, achievements, the start of a new career, marriage, retirement, promotion, change in job, and the like. In an embodiment, the plurality of first user details may be stored in a database (as shown in FIG. 2). In one exemplary embodiment, the database may include a local database or a cloud database. In one embodiment, the first user device may include a mobile phone, a tablet, a laptop, or the like. Moreover, in one embodiment, the centralized platform may be substantially similar to the system 10. In another embodiment, the centralized platform may be a platform used to control operations of the system 10 by the first user via a first user interface.

In one embodiment, the one or more inputs may include at least one of one or more multimedia of the entity, a plurality of entity details, one or more messages to be communicated to one or more second users, and the like. Further, in one embodiment, the plurality of entity details may include a name, birthday details, anniversary details, one or more events-related details, favorites, hobbies, likes and dislikes, relatives' names, friends' names, physical appearances description, behavior-related description, and the like of the like. In one exemplary embodiment, the first user may share the virtual model of the entity with the one or more second users. In such embodiment, the first user may have to provide the one or more messages which the first user is willing to convey to the one or more second users via the virtual model of the entity shared, and hence the corresponding one or more messages are also included in the one or more inputs received by the virtual model generation module 40.

Further, the system 10 may have to analyze the one or more inputs received in order to learn one or more features of the entity. Thus, the virtual model generation module 40 is also configured to generate a learning model based on a pre-stored dataset. The learning model is configured to learn the one or more features corresponding to the entity in real-time upon analyzing the one or more inputs using a machine learning (ML) technique. In one embodiment, the one or more features may include at least one of a tone, a behavior, a physical appearance, and the like of the entity. As used herein, the term "machine learning technique" is defined as an application of artificial intelligence that provides systems the ability to automatically learn and improve from experience without being explicitly programmed. In one embodiment, the machine learning technique may include at least one of an image processing technique, a voice processing technique, a video processing technique, and the like. Basically, in an embodiment, the learning model may be generated upon feeding the pre-stored dataset including one or more instructions according to which the learning model may have to respond or process the one or more inputs received by the learning model.

As used herein, the term "image processing technique" is defined as a method to perform some operations on an image, in order to get an enhanced image or to extract some useful information from it. As used herein, the term "voice processing technique" is defined as a technique for analyzing a pattern of voice signals or speech signals received upon applying the voice recognition technique through voice biometrics using at least one of an Automatic Speech Recognition (ASR) technique, a Natural Language Understanding (NLU) technique, and the like. As used herein, the term "Automatic Speech Recognition technique" is defined as the process of deriving the transcription (word sequence) of an utterance or audio, given the speech waveform. Basically, the technique is converting speech into text. Further, as used herein, the term "Natural Language Understanding technique" is defined as an artificial intelligence-based technique that is used to extract information from the text or extract the meaning of the text, thereby allowing humans to interact with the computers using natural sentences.

Furthermore, as the learning model learns itself the one or more features of the entity, now the virtual model may have to be generated using the corresponding learning model. Thus, the virtual model generation module 40 is also configured to generate the virtual model of the entity based on the learning model using an image analysis-based technique, wherein the virtual model corresponds to an interactive virtual representative of the entity. In one exemplary embodiment, the virtual model may include a digital twin of the entity. In such embodiment, the digital twin of the entity may include a two-dimensional (2-D) model or a three-dimensional (3-D) model, a 2-D character or a 3-D character, a 2-D avatar or a 3-D avatar, or the like of the entity. In an embodiment, the digital twin may appear on an electronic device. The electronic device may include a mobile phone, a tablet, a laptop, or the like. In another exemplary embodiment, the virtual model may include a 3-D hologram of the entity which may be visible in the real world to human eyes upon viewing through preset digital equipment. In one embodiment, the preset digital equipment may include a head-mounted display.

As used herein, the term "image analysis-based technique" is defined as a technique which is used to generate a virtual model of an entity by understanding the features of the entity. In one embodiment, the image analysis-based technique may include at least one of an Augmented Reality (AR) technique, a Virtual Reality (VR) technique, a Mixed Reality (MR) technique, an Artificial Intelligence (AI) technique, the ML technique, and the like. As used herein, the term "Augmented Reality" is defined as an interactive experience of a real-world environment where the user is provided with additional computer-generated information that enhances their perception of reality. As used herein the term "Virtual Reality" is defined as a simulated experience that can be similar to or completely different from the real world and the surrounding environment is completely virtual. Further, as used herein, the term "Mixed Reality" is defined as the merging of real and virtual worlds to produce new environments and visualizations, where physical and digital objects co-exist and interact in real-time. Mixed reality does not exclusively take place in either the physical or virtual world but is a hybrid of reality and virtual reality. Basically, MR is a combination of AR and VR along with Augmented Virtuality (AV). In other words, VR referring to an artificial environment which is experienced through sensory stimuli (such as sights and sounds) provided by a computer and in which one's actions partially determine what happens in the environment. AR referring to an enhanced version of reality created by the use of technology to overlay digital information on an image of something being viewed through a device. Similarly, MR is unique in that the term usually refers to artificial products that interact with users in the real world. Further, AV is a subcategory of MR that refers to the merging of real-world objects into virtual worlds.

Further, as used herein, the term "artificial intelligence" refers to the simulation of human intelligence in machines that are programmed to think like humans and mimic their actions. Thus, when the AI technique is used in combination with at least one of AR, VR, MR, and the like, the system 10 can generate the virtual model of the entity which learns the one or more features of the entity, remembers the same, and respond to inputs received from a user approximately in a way in which the entity may respond. Moreover, upon generating the virtual model, in order to interact, the first user may have to create an event such that even without the consent or the presence of the first user, the event may have to get triggered in real-time upon satisfying certain conditions. Thus, the processing subsystem 20 also includes an event creating module 50 operatively coupled to the virtual model generation module 40. The event creating module 50 is configured to create the event by associating the event with the virtual model generated by the virtual model generation module 40. The event corresponds to the virtual model-based interaction. In one embodiment, the event may include at least one of a birthday event, an achievement event, an anniversary event, a daily basic interaction event, and like.

Suppose the first user may create the event via the event creating module 50 in order to communicate with the one or more second users through the virtual model of the entity, with the entity being the first user. Also, suppose the one or more second users are related to the first user with a predefined relationship. However, the first user and the corresponding one or more second users are connected to each other on the centralized platform. Thus, initially, the predefined relationship may have to be searched on the centralized platform, then the connection between the first user and the one or more second users may be established, and then the event may get triggered based on the certain conditions. Thus, the processing subsystem 20 also includes a relationship searching module 60 operatively coupled to the event creating module 50. The relationship searching module 60 is configured to receive a plurality of relationship-based details corresponding to a relationship between the first user and the one or more second users, upon creating the event. Basically, in one embodiment, upon registration, the first user may provide the plurality of relationship-based details on the centralized platform. In one embodiment, the plurality of relationship-based details may include a name of one or more relatives of the first user, a relationship corresponding to the one or more relatives, and the like. Thus, the one or more second users may correspond to the one or more relatives of the first user.

Additionally, upon knowing the relationship between the first user and the one or more second users, an account associated with the one or more second users who are related to the first user and who are registered on the centralized platform may have to be searched on the centralized platform. Thus, the relationship searching module 60 is also configured to search the account associated with the one or more second users on the centralized platform upon receiving the corresponding plurality of relationship-based details. Later, upon searching the account, the connection may have to be established. Thus, the processing subsystem 20 also includes a connection management module 70 operatively coupled to the relationship searching module 60. The connection management module 70 is configured to generate a connection request upon searching and selecting the account associated with the one or more second users. The connection management module 70 is also configured to establish the connection between the first user and the one or more second users when the corresponding one or more second users accept the connection request. The connection management module 70 is also configured to provide a plurality of second user details corresponding to the one or more second users to the first user on the centralized platform upon establishing the connection. In one embodiment, the plurality of second user details may include at least one of birthday details, achievement-related details, anniversary details, personal details, and the like of the one or more second users. In one exemplary embodiment, the connection management module 70 may also be configured to provide the plurality of first user details corresponding to the first user to the one or more second users on the centralized platform upon establishing the connection.

Subsequently, the event may have to be triggered upon satisfying the certain conditions. In one exemplary embodiment, the certain conditions may include an arrival of a date when the event was supposed to be triggered, an arrival of an occasion when the event was supposed to be triggered, and the like. In one embodiment, the occasion may include a birthday, an anniversary, an achievement, or the like. Thus, the processing subsystem 20 also includes an event triggering module 80 operatively coupled to the connection management module 70. The event triggering module 80 is configured to extract one or more event-related keywords from the event created by the event creating module 50 upon obtaining the corresponding plurality of second user details. The event triggering module 80 is also configured to trigger the event in real-time at a predefined schedule obtained based on mapping of the one or more event-related keywords with the plurality of second user details, thereby rendering the virtual model-based interaction. In one embodiment, the one or more event-related keywords may include a birthday, an anniversary, an achievement, and the like. Basically, the event-related keywords may be mapped with the plurality of second user details, and data corresponding to the one or more event-related keywords within the plurality of second user details may be extracted. Further, based in the data extracted, the event may be triggered. In one embodiment, the data may include a date, a time, a day, an event, a message, and the like.

For example, the first user has created the event of sending a birthday wish to a fourth-generation grandson of the first user. Here, the one or more event-related keywords correspond to terms such as 'birthday' and 'fourth-generation grandson'. Later, a plurality of details of the fourth-generation grandson may be available for the first user, when the fourth-generation grandson registers on the centralized and accepts the connection request of the first user. Further, when the fourth-generation grandson registers on the centralized platform, the first user will have died and hence, the system 10 might perform the mapping of the one or more event-related keywords and the plurality of details of the fourth-generation grandson and extracts the birthday date of the fourth-generation grandson. Further, the event might get triggered on the date of the birthday of the fourth-generation grandson and the fourth-generation grandson might be able to have the virtual model-based interaction with the first user along with receiving the birthday wish from the first user via the virtual model of the first user.

In one exemplary embodiment, the processing subsystem 20 may also include an alert generation module (as shown in FIG. 2) operatively coupled to the event triggering module 80. The alert generation module may be configured to generate an alert for the one or more second users at a preset schedule prior to the triggering of the event by the event triggering module 80. Basically, there is a possibility that the one or more second users may not be active on the centralized platform when the corresponding event is supposed to be triggered. Thus, the alert may be generated via the alert generation module prior for the one or more second users to be active while the triggering of the event. In one embodiment, the alert may be generated in one or more forms such as, but not limited to, a text message, an E-mail, an audio alert, or the like.

FIG. 2 is a block diagram representation of an exemplary embodiment of the system 10 for rendering the virtual model-based interaction of FIG. 1 in accordance with an embodiment of the present disclosure. Suppose a user 'A' 90 who is willing to communicate with a user 'B' 100, might use the system 10 to generate the virtual model of the user 'B' 100 and then communicate with the virtual model. The system 10 includes the processing subsystem 20 which is hosted on the server 30. Further, in order to use the system 10, the user 'A' 90 registers on the centralized platform via the registration module 110 upon providing the plurality of first user details of the user 'A' 90 a first mobile phone 120 of the user 'A' 90. The plurality of first user details is stored in the database 130 of the system 10. Upon registration, the user 'A' 90 generates the virtual model via the virtual model generation module 40. As the virtual model is generated using the ML technique along with at least one of the AR technique, the VR technique, the MR technique, and the like, the virtual model of the user 'B' 100 will be able to respond to the user 'A' 90 in a way in which the user 'B' 100 might respond. Here, the user 'B' 100 may or may not be aware of the generation of the virtual model as the user 'A' 90 might feed information about the user 'B' 100 which the user 'B' 100 has. In this case, the user 'B' 100 can be died or alive.

In an alternative case, suppose the user 'A' 90 may be willing to be available for a fourth generation 140 of the user 'A' 90, for the fourth generation 140 of the user 'A' 90 to be able to communicate with the user 'A' 90 even when the user 'A' 90 is not alive or cannot be physically available. In such a case also the user 'A' 90 can use the system 10. Basically, the user 'A' 90 can generate the virtual model of the user 'A' 90 via the virtual model generation module 40. Later, the user 'A' 90 can create the event of sending a birthday wish, an anniversary wish, an achievement wish to the fourth generation 140 through the virtual model of the user 'A' 90 via the event creating module 50. Further, all the upcoming generations including the fourth generation 140 should also be registered on the centralized platform via a second mobile phone 145 in order to be able to receive any communication from the user 'A' 90. Suppose the fourth generation 140 of the user 'A' 90 has arrived and also registered on the centralized platform. Therefore, the system 10 receives information about the one or more relatives of the user 'A' 90 and searches the account associated with the fourth generation 140 90 via the relationship searching module 60. Later, the system 10 sends a connection request via the connection management module 70 once the account of the fourth generation 140 is found and selected. Later, when the fourth generation 140 accepts the connection request, the plurality of second user details of the fourth generation 140 may be available for an account of the user 'A' 90. Also, the plurality of first user details may be available for the fourth generation 140 which helps the fourth generation 140 to know more about the user 'A' 90.

Suppose a birthday of the fourth generation 140 has arrived, then the one or more event-related keywords such as the term 'birthday' and 'fourth generation 140' are mapped with the plurality of second user details via the event triggering module 80. Now, upon mapping, the system 10 extracts the birthday date of the fourth generation 140. Further, the event might get triggered on the date of the birthday of the fourth generation 140 and the fourth generation 140 might be able to have the virtual model-based interaction with the user 'A' 90 along with receiving the birthday wish from the user 'A' 90 via the virtual model of the user 'A' 90. Prior to triggering the corresponding event, the fourth generation 140 also receives the alert about the same via a text message, which is generated via the alert generation module 150.

Figure 3:
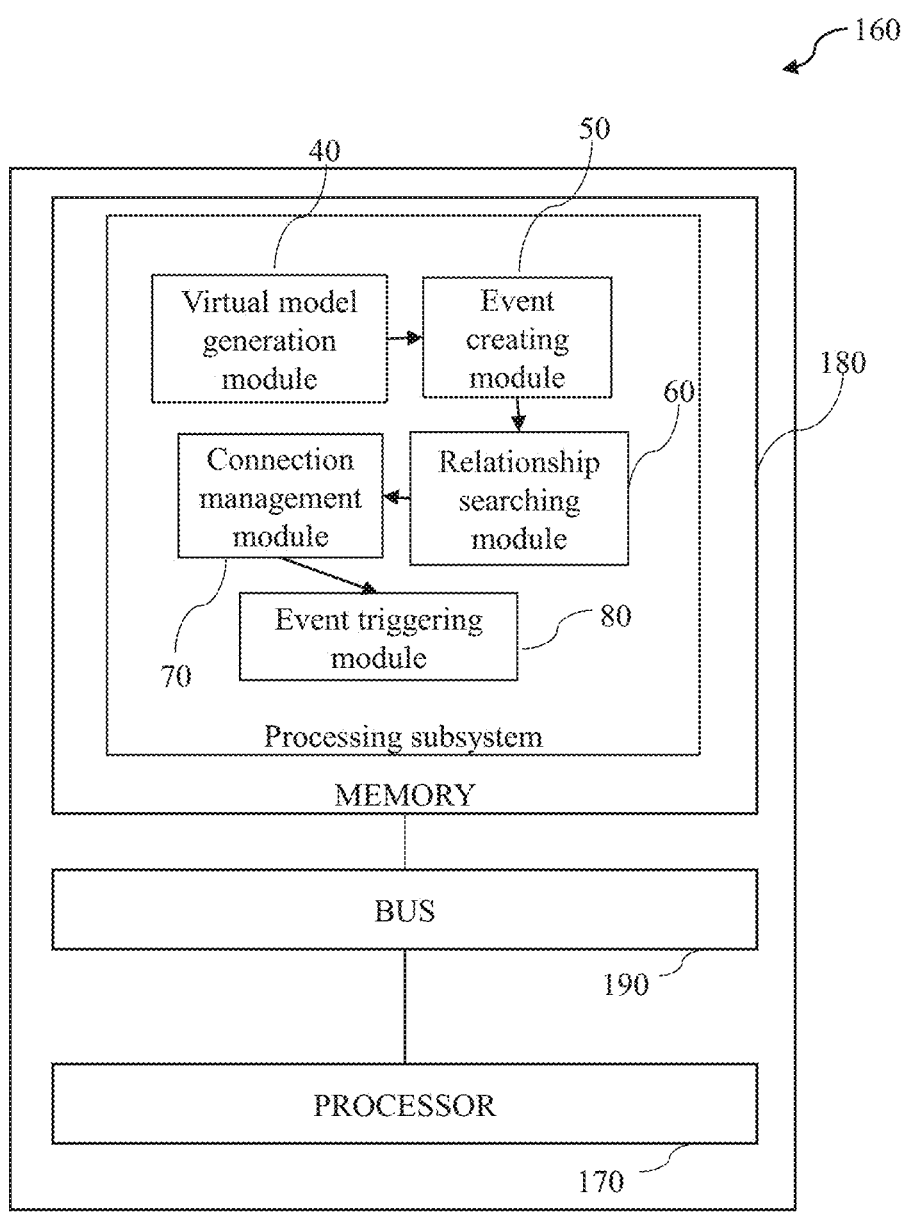
FIG. 3 is a block diagram of an interaction management computer or an interaction management server in accordance with an embodiment of the present disclosure.

FIG. 3 is a block diagram of an interaction management computer or an interaction management server 160 in accordance with an embodiment of the present disclosure. The interaction management server 160 includes processor(s) 170, and memory 180 operatively coupled to a bus 190. The processor(s) 170, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 170.

Figure 4A:
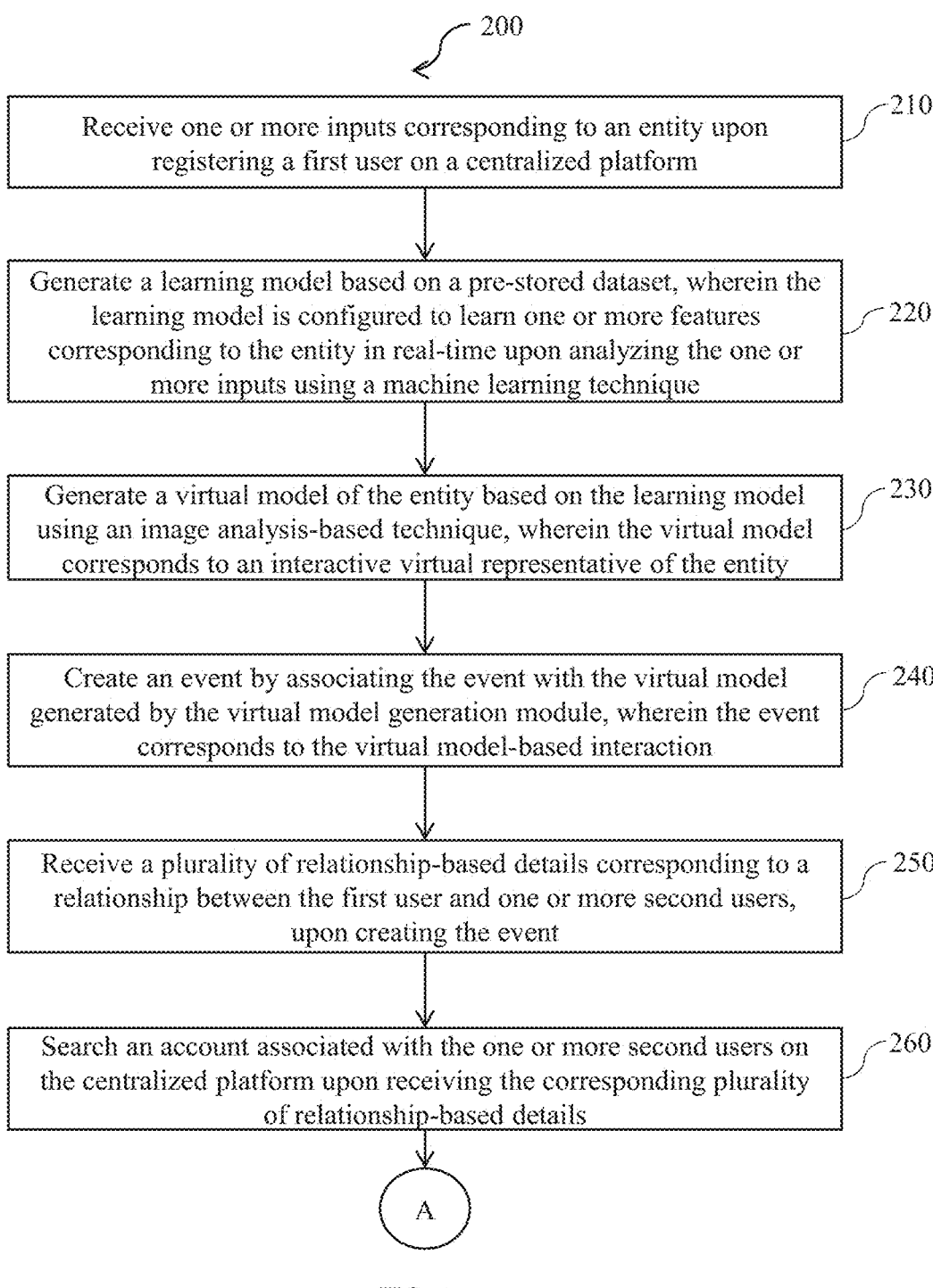
FIG. 4a and FIG. 4b are flow charts representing steps involved in a method for rendering a virtual model-based interaction in accordance with an embodiment of the present disclosure.
Figure 4B:
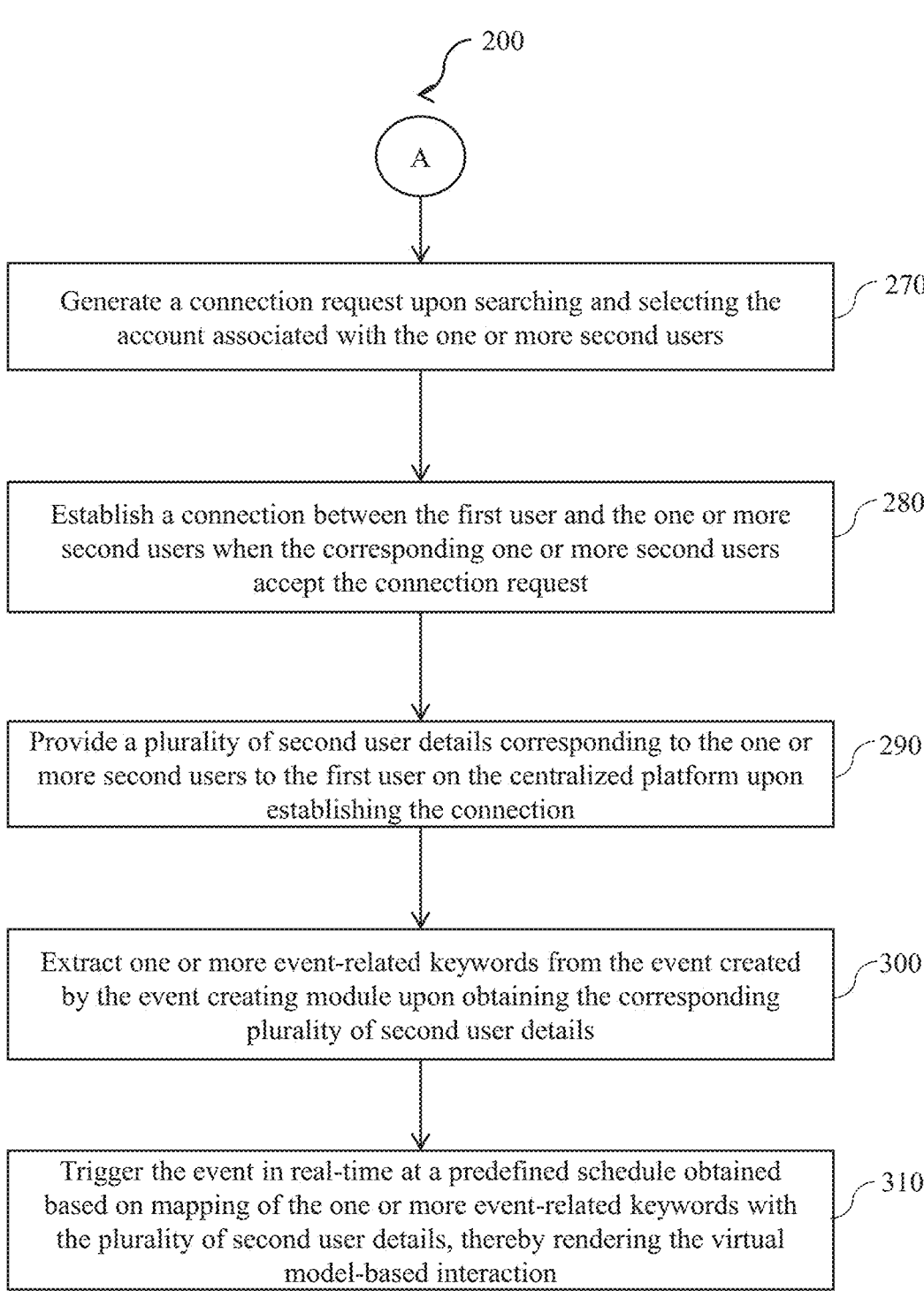

The memory 180 includes a plurality of subsystems stored in the form of executable program which instructs the processor(s) 170 to perform method steps illustrated in FIG. 4a and FIG. 4b. The memory 180 includes the processing subsystem 20 of FIG. 1. The processing subsystem 20 further has following modules: a virtual model generation module 40, an event creating module 50, a relationship searching module 60, a connection management module 70, and an event triggering module 80.

The virtual model generation module 40 is configured to receive one or more inputs corresponding to an entity upon registering a first user on a centralized platform. The virtual model generation module 40 is also configured to generate a learning model based on a pre-stored dataset, wherein the learning model is configured to learn one or more features corresponding to the entity in real-time upon analyzing the one or more inputs using a machine learning technique. The virtual model generation module 40 is also configured to generate a virtual model of the entity based on the learning model using an image analysis-based technique. The event creating module 50 is configured to create an event by associating the event with the virtual model generated by the virtual model generation module 40. The relationship searching module 60 is configured to receive a plurality of relationship-based details corresponding to a relationship between the first user and one or more second users upon creating the event. The relationship searching module 60 is also configured to. The relationship searching module 60 is also configured to search an account associated with the one or more second users on the centralized platform upon receiving the corresponding plurality of relationship-based details.

The connection management module 70 is configured to generate a connection request upon searching and selecting the account associated with the one or more second users. The connection management module 70 is also configured to establish a connection between the first user and the one or more second users when the corresponding one or more second users accept the connection request. The connection management module 70 is also configured to provide a plurality of second user details corresponding to the one or more second users to the first user on the centralized platform upon establishing the connection. The event triggering module 80 is configured to extract one or more event-related keywords from the event created by the event creating module 50 upon obtaining the corresponding plurality of second user details. The event triggering module 80 is also configured to trigger the event in real-time at a predefined schedule obtained based on mapping of the one or more event-related keywords with the plurality of second user details, thereby rendering the virtual model-based interaction.

The bus 190 as used herein refers to be internal memory channels or computer network that is used to connect computer components and transfer data between them. The bus 190 includes a serial bus or a parallel bus. The bus 190 as used herein, may include but not limited to, a system bus, an internal bus, an external bus, an expansion bus, a frontside bus, a backside bus and the like.

FIG. 4a and FIG. 4b are flow charts representing steps involved in a method 200 for rendering the virtual model-based interaction in accordance with an embodiment of the present disclosure. The method 200 includes receiving one or more inputs corresponding to an entity upon registering a first user on a centralized platform in step 210. In one embodiment, receiving the one or more inputs may include receiving the one or more inputs by a virtual model generation module 40.

The method 200 also includes generating a learning model based on a pre-stored dataset, wherein the learning model is configured to learn one or more features corresponding to the entity in real-time upon analyzing the one or more inputs using a machine learning technique in step 220. In one embodiment, generating the learning model may include generating the learning model by the virtual model generation module 40.

Furthermore, the method 200 includes generating a virtual model of the entity based on the learning model using an image analysis-based technique, wherein the virtual model corresponds to an interactive virtual representative of the entity in step 230. In one embodiment, generating the virtual model may include generating the virtual model by the virtual model generation module 40.

Furthermore, the method 200 also includes creating an event by associating the event with the virtual model generated by the virtual model generation module, wherein the event corresponds to the virtual model-based interaction in step 240. In one embodiment, creating the event may include creating the event by an event creating module 50.

Furthermore, the method 200 also includes receiving a plurality of relationship-based details corresponding to a relationship between the first user and one or more second users upon creating the event in step 250. In one embodiment, receiving the plurality of relationship-based details may include receiving the plurality of relationship-based details by a relationship searching module 60.

Furthermore, the method 200 also includes searching an account associated with the one or more second users on the centralized platform upon receiving the plurality of relationship-based details in step 260. In one embodiment, searching the account may include searching the account by the relationship searching module 60.

Furthermore, the method 200 also includes generating a connection request upon searching and selecting the account associated with the one or more second users in step 270. In one embodiment, generating the connection request may include generating the connection request by a connection management module 70.

Furthermore, the method 200 also includes establishing a connection between the first user and the one or more second users when the corresponding one or more second users accept the connection request in step 280. In one embodiment, establishing the connection may include establishing the connection by the connection management module 70.

Furthermore, the method 200 also includes providing a plurality of second user details corresponding to the one or more second users to the first user on the centralized platform upon establishing the connection in step 290. In one embodiment, providing the plurality of second user details may include providing the plurality of second user details by the connection management module 70.

Furthermore, the method 200 also includes extracting one or more event-related keywords from the event created by the event creating module upon obtaining the corresponding plurality of second user details in step 300. In one embodiment, extracting the one or more event-related keywords may include extracting the one or more event-related keywords by an event triggering module 80.

Furthermore, the method 200 also includes triggering the event in real-time at a predefined schedule obtained based on mapping of the one or more event-related keywords with the plurality of second user details, thereby rendering the virtual model-based interaction in step 310. In one embodiment, triggering the event may include triggering the event by the event triggering module 80. In one exemplary embodiment, the method 200 may also include generating an alert for the one or more second users at a preset schedule prior to the triggering of the event by the event triggering module. In such embodiment, generating the alert may include generating the alert by an alert generation module 150.

Further, from a technical effect point of view, the implementation time required to perform the method steps included in the present disclosure by the one or more processors of the system is very minimal, thereby the system maintains very minimal operational speed.

Various embodiments of the present disclosure enable the rendering of the virtual model-based interaction with less complexity involved in implementation as huge data storage is not required because minimal information about the entity is enough to generate the virtual model of the entity. Also, the system enables the virtual model-based interaction of a person who is not alive with upcoming generations of the person through the virtual model of the person by providing a facility for the person to create the event for the same when alive, thereby making the system more efficient and more reliable.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

13

14

We claim:

1. A system for rendering a virtual model-based interaction, wherein the system comprises:

a processing subsystem hosted on a server, and configured to execute on a network to control bidirectional communications among a plurality of modules comprising:

a virtual model generation module configured to:

receive one or more inputs corresponding to an entity upon registering a first user on a centralized platform;

generate a learning model based on a pre-stored dataset, wherein the learning model is configured to learn one or more features corresponding to the entity in real-time upon analyzing the one or more inputs using a machine learning technique; and generate a virtual model of the entity based on the learning model using an image analysis-based technique, wherein the virtual model corresponds to an interactive virtual representative of the entity;

an event creating module operatively coupled to the virtual model generation module, wherein the event creating module is configured to generate an event by associating the event with the virtual model generated by the virtual model generation module, wherein the event corresponds to the virtual model-based interaction;

a relationship searching module operatively coupled to the event generating module, wherein the relationship searching module is configured to:

receive a plurality of relationship-based details corresponding to a relationship between the first user and one or more second users, upon creating the event; and search an account associated with the one or more second users on the centralized platform upon receiving the corresponding plurality of relationship-based details;

a connection management module operatively coupled to the relationship searching module, wherein the connection management module is configured to:

generate a connection request upon searching and selecting the account associated with the one or more second users;

establish a connection between the first user and the one or more second users when the corresponding one or more second users accept the connection request; and provide a plurality of second user details corresponding to the one or more second users to the first user on the centralized platform upon establishing the connection; and an event triggering module operatively coupled to the connection management module, wherein the event triggering module is configured to:

extract one or more event-related keywords from the event created by the event creating module upon obtaining the corresponding plurality of second user details; and trigger the event in real-time at a predefined schedule obtained based on mapping of the one or more event-related keywords with the plurality of second user details, thereby rendering the virtual model-based interaction.

2. The system as claimed in claim 1, wherein the one or more inputs comprises at least one of one or more multimedia of the entity, a plurality of entity details, and one or more messages to be communicated to the one or more second users.

3. The system as claimed in claim 1, wherein the one or more features comprises at least one of a tone, a behavior, and a physical appearance of the entity.

4. The system as claimed in claim 1, wherein the image analysis-based technique comprises at least one of an Augmented Reality technique, a Virtual Reality technique, a Mixed Reality technique, an Artificial Intelligence technique, and a Machine Learning technique.

5. The system as claimed in claim 1, wherein the event comprises at least one of a birthday event, an achievement event, an anniversary event, and a daily basic interaction event.

6. The system as claimed in claim 1, wherein the plurality of second user details comprises at least one of birthday details, achievement-related details, anniversary details, and personal details of the one or more second users.

7. The system as claimed in claim 1, wherein the connection management module is configured to provide a plurality of first user details corresponding to the first user to the one or more second users on the centralized platform upon establishing the connection.

8. The system as claimed in claim 1, wherein the processing subsystem comprises an alert generation module operatively coupled to the event triggering module, wherein the alert generation module is configured to generate an alert for the one or more second users at a preset schedule prior to the triggering of the event by the event triggering module.

9. A method for rendering a virtual model-based interaction, wherein the method comprises:

receiving, by a virtual model generation module, one or more inputs corresponding to an entity upon registering a first user on a centralized platform;

generating, by the virtual model generation module, a learning model based on a pre-stored dataset, wherein the learning model is configured to learn one or more features corresponding to the entity in real-time upon analyzing the one or more inputs using a machine learning technique;

generating, by the virtual model generation module, a virtual model of the entity based on the learning model using an image analysis-based technique, wherein the virtual model corresponds to an interactive virtual representative of the entity;

creating, by an event creating module, an event by associating the event with the virtual model generated by the virtual model generation module, wherein the event corresponds to the virtual model-based interaction;

receiving, by a relationship searching module, a plurality of relationship-based details corresponding to a relationship between the first user and one or more second users, upon creating the event;

searching, by the relationship searching module, an account associated with the one or more second users on the centralized platform upon receiving the plurality of relationship-based details;

generating, by a connection management module, a connection request upon searching and selecting the account associated with the one or more second users;

establishing, by the connection management module, a connection between the first user and the one or more second users when the corresponding one or more second users accept the connection request;

providing, by the connection management module, a plurality of second user details corresponding to the one or more second users to the first user on the centralized platform upon establishing the connection;

extracting, by an event triggering module, one or more event-related keywords from the event created by the event creating module upon obtaining the corresponding plurality of second user details; and triggering, by the event triggering module, the event in real-time at a predefined schedule obtained based on mapping of the one or more event-related keywords with the plurality of second user details, thereby rendering the virtual model-based interaction.

10. The method as claimed in claim 9, comprises generating, by an alert generation module, an alert for the one or more second users at a preset schedule prior to the triggering of the event by the event triggering module.

* * * * *